United States Patent
Sakai et al.

(10) Patent No.: US 12,169,972 B2
(45) Date of Patent: Dec. 17, 2024

(54) OBJECT RECOGNITION CONTROL DEVICE (71) Applicant: JVCKENWOOD Corporation, Yokohama (JP)

(72) Inventors: Yasutoshi Sakai, Yokohama (JP); Keita Hayashi, Yokohama (JP); Hirofumi Taniyama, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 5 days.

(21) Appl. No.: 18/108,682

(22) Filed: Feb. 13, 2023

(65) Prior Publication Data

US 2023/0196789 A1 Jun. 22, 2023

Related U.S. Application Data (63) Continuation of application No. PCT/JP2021/009664, filed on Mar. 10, 2021.

(30) Foreign Application Priority Data

Aug. 28, 2020 (JP) ................................. 2020-145071

(51) Int. Cl.
*G06V 20/58* (2022.01)
*G08G 1/16* (2006.01)

(52) U.S. Cl.
CPC ............. *G06V 20/58* (2022.01); *G08G 1/16* (2013.01)

(58) Field of Classification Search
None
See application file for complete search history.

(56) References Cited

U.S. PATENT DOCUMENTS 9,721,538 B2 * 8/2017 Naganawa ............. G09G 5/377
9,730,098 B2 * 8/2017 Noriega ................ H04W 24/02
(Continued)

FOREIGN PATENT DOCUMENTS

| JP | 2015-035704 | 2/2015 |
| JP | 2016-015029 | 1/2016 |
| JP | 2016-166767 | 9/2016 |

OTHER PUBLICATIONS

International Search Report and Written Opinion for International Application No. PCT/JP2021/009664 mailed on May 18, 2021, 9 pages.

*Primary Examiner* — Fekadeselassie Girma
(74) *Attorney, Agent, or Firm* — Amin, Turocy & Watson, LLP (57) ABSTRACT

An object recognition control device includes an image data acquisition unit configured to acquire image data captured by a camera that images a periphery of a vehicle; a traveling speed information acquisition unit configured to acquire information about a traveling speed of the vehicle; a recognition processing unit configured to recognize, as a specific object, the image data acquired by the image data acquisition unit in a case in which a score indicating a likelihood of the specific object is equal to or larger than a predetermined threshold; and a presentation processing unit configured to present, to a driver of the vehicle, information on the specific object recognized by the recognition processing unit. The recognition processing unit is further configured to lower the predetermined threshold when the information about the traveling speed acquired by the traveling speed information acquisition unit indicates that the traveling speed of the vehicle is high.

7 Claims, 6 Drawing Sheets

(56) References Cited

U.S. PATENT DOCUMENTS

| | | | | |
|---|---|---|---|---|
| 10,121,254 | B2* | 11/2018 | Wang | G06T 7/215 |
| 10,136,100 | B2* | 11/2018 | Ranbro | H04N 7/181 |
| 10,286,834 | B2* | 5/2019 | Ogawa | G06V 10/60 |
| 10,635,923 | B2* | 4/2020 | Tani | G06T 7/13 |
| 11,055,834 | B2* | 7/2021 | Shibata | H04N 1/00164 |
| 11,323,617 | B2* | 5/2022 | Sugioka | G06T 3/4038 |
| 2014/0270487 | A1* | 9/2014 | Park | G06T 5/50 |
| | | | | 382/155 |
| 2015/0042805 | A1 | 2/2015 | Okumura et al. | |
| 2015/0310285 | A1* | 10/2015 | Ogata | G06V 40/10 |
| | | | | 382/104 |
| 2016/0104046 | A1* | 4/2016 | Doettling | F16M 13/02 |
| | | | | 382/103 |
| 2016/0214608 | A1* | 7/2016 | Packwood-Ace | B60W 30/143 |
| 2017/0151943 | A1 | 6/2017 | Goto | |
| 2017/0174227 | A1* | 6/2017 | Tatourian | G06V 20/58 |
| 2017/0193310 | A1* | 7/2017 | Yu | G06F 18/24133 |
| 2018/0229729 | A1* | 8/2018 | McQuillen | B60L 15/20 |
| 2019/0056962 | A1* | 2/2019 | Ng | G06F 9/452 |
| 2020/0298852 | A1* | 9/2020 | Tanaka | G06V 20/588 |
| 2021/0124360 | A1* | 4/2021 | MacDonald | G05D 1/0214 |
| 2022/0237927 | A1* | 7/2022 | Hiei | G06V 10/60 |
| 2023/0196789 | A1* | 6/2023 | Sakai | B60W 50/14 |
| | | | | 340/441 |

* cited by examiner

OBJECT RECOGNITION CONTROL DEVICE

CROSS-REFERENCE TO RELATED APPLICATIONS

This application is a Continuation of PCT International Application No. PCT/JP2021/009664 filed on Mar. 10, 2021 which claims the benefit of priority from Japanese Patent Application No. 2020-145071 filed on Aug. 28, 2020, the entire contents of both of which are incorporated herein by reference.

FIELD

The present application relates to an object recognition control device.

BACKGROUND

Regarding person recognition in a captured image, a person is determined in a case in which a score indicating a likelihood of a person is equal to or larger than a predetermined threshold based on a result of recognition processing by person recognition processing.

For example, Japanese Patent Application Laid-open No. 2016-15029 discloses a technique of determining that an object is a pedestrian when a score indicating a likelihood of a pedestrian is high using a recognition dictionary for a captured image.

When a traveling speed of a vehicle is increased, edges of a person and the like in each frame of the captured image may become unclear and a recognition rate may be lowered, so that there is a possibility that presence of a person and the like cannot be recognized. Additionally, when the traveling speed is increased, there is a possibility that danger is caused in a case in which a specific object such as a person cannot be recognized. Furthermore, when the traveling speed is increased, there is a possibility that a driver of the vehicle pays less attention to a person and the like.

An object recognition control device is disclosed.

SUMMARY

According to one aspect, there is provided an object recognition control device comprising: an image data acquisition unit configured to acquire image data captured by a camera that images a periphery of a vehicle; a traveling speed information acquisition unit configured to acquire information about a traveling speed of the vehicle; a recognition processing unit configured to recognize, as a specific object, the image data acquired by the image data acquisition unit in a case in which a score indicating a likelihood of the specific object is equal to or larger than a predetermined threshold; and a presentation processing unit configured to present, to a driver of the vehicle, information on the specific object recognized by the recognition processing unit, wherein the recognition processing unit is further configured to lower the predetermined threshold when the information about the traveling speed acquired by the traveling speed information acquisition unit indicates that the traveling speed of the vehicle is high.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

The following describes embodiments according to the present application in detail with reference to the attached drawings. The present application is not limited to the embodiments, and encompasses a configuration obtained by combining embodiments in a case in which there are a plurality of embodiments. In the following embodiments, the same part is denoted by the same reference numeral, and redundant description will not be repeated.

First Embodiment

Figure 1:
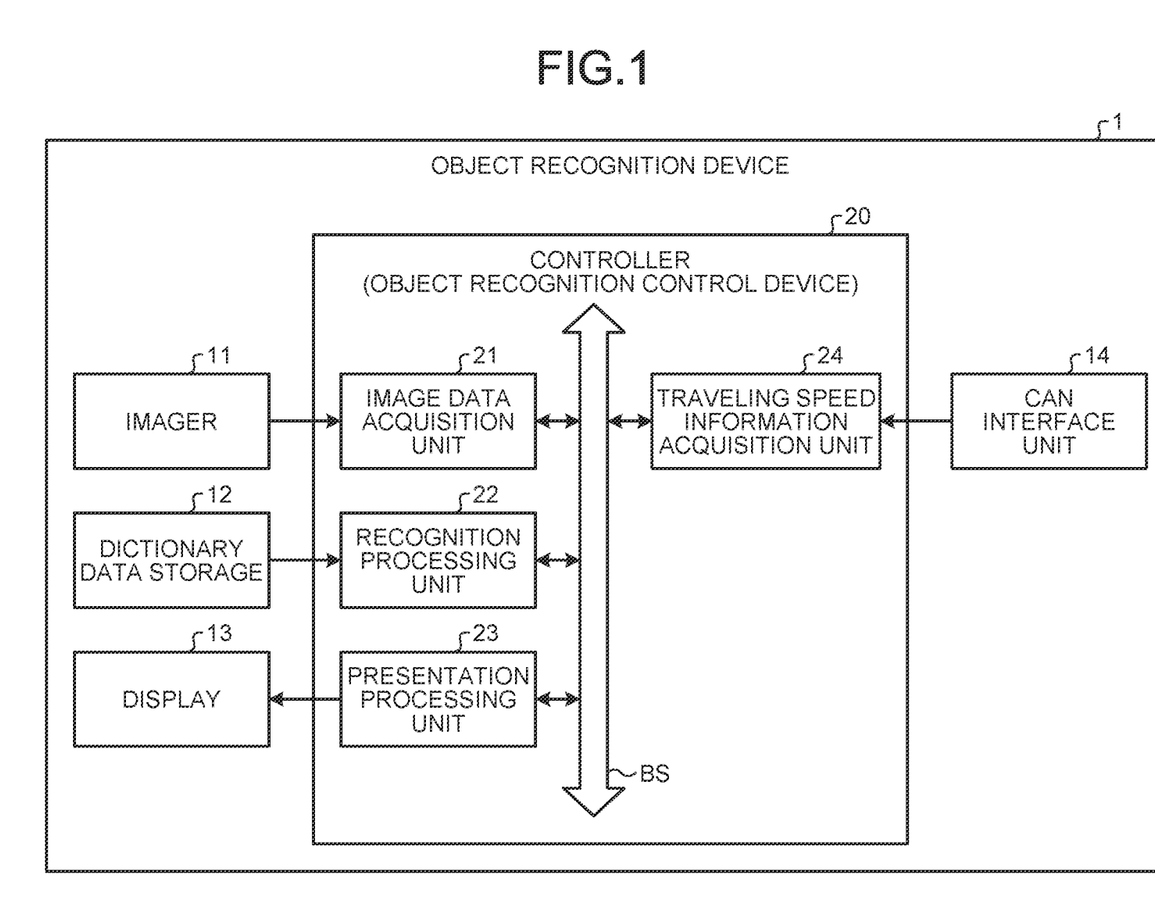
FIG. 1 is a block diagram illustrating a configuration example of an object recognition device according to a first embodiment.

The following describes an object recognition device according to a first embodiment with reference to FIG. 1. FIG. 1 is a block diagram illustrating a configuration example of the object recognition device according to the first embodiment.

As illustrated in FIG. 1, an object recognition device 1 includes an imager 11, a dictionary data storage 12, a display 13, a controller area network (CAN) interface unit 14, and a controller (object recognition control device) 20. The object recognition device 1 is not limited to a device mounted on a vehicle but may be a portable device that can be used in the vehicle. The object recognition device 1 may also be implemented as a function of a device having a safe driving support function, a navigation device, a drive recorder, or the like that is previously installed on the vehicle.

The imager 11 is mounted on the vehicle, and disposed to image a front side of the vehicle. The imager 11 is, for example, constituted of a visible light camera or a far-infrared camera. The imager 11 may also be constituted of a combination of a visible light camera and a far-infrared camera, for example. The imager 11 outputs captured image data to an image data acquisition unit 21.

The dictionary data storage 12 stores dictionary data for recognizing various objects from the image data. For example, the dictionary data storage 12 stores recognition dictionary data with which it is possible to verify that an object included in the image data is a person based on a machine learning of various captured images of a person. For example, the dictionary data storage 12 stores recognition dictionary data with which it is possible to verify that an object included in the image data is a bicycle based on a machine learning of various captured images of a bicycle on which a person is riding. For example, the dictionary data storage 12 may store recognition dictionary data with which it is possible to verify that an object included in the image data is an automobile, a motorcycle, and the like based on a machine learning of various captured images of an automobile, a motorcycle, and the like. The dictionary data storage 12 is, for example, implemented by a storage device such as a semiconductor memory element including a random access memory (RAM), a flash memory, and the like.

The display 13 displays various pieces of information. In a case in which a specific object is recognized, the display 13 displays information about the specific object to make a notification to a driver and the like of the vehicle. The display 13 is, for example, a display including a liquid crystal display (LCD), an organic electro-luminescence (EL) display, or the like.

The CAN interface unit 14 is an interface that acquires various pieces of vehicle information via a CAN. The vehicle information includes state information about a state of the vehicle. The state information includes, for example, information about a traveling speed of the vehicle and an acceleration of the vehicle. The vehicle information may include driving operation information about a driving operation for the vehicle. The driving operation information includes, for example, operation information about a steering operation, a brake operation, an accelerator operation, and the like.

The controller 20 controls operation of each component of the object recognition device 1. The controller 20 is, for example, implemented by executing a computer program stored in a storage (not illustrated) by a central processing unit (CPU), a micro processing unit (MPU), and the like using a RAM and the like as a working area. Thus, the controller 20 causes the object recognition device 1 to perform an object recognition method. The controller 20 is a computer that causes a computer program according to the present application to operate. The controller 20 may be implemented by an integrated circuit such as an application specific integrated circuit (ASIC) or a field programmable gate array (FPGA), for example. The controller 20 may also be implemented by a combination of hardware and software.

The controller 20 includes the image data acquisition unit 21, a recognition processing unit 22, a presentation processing unit 23, and a traveling speed information acquisition unit 24. In FIG. 1, the image data acquisition unit 21, the recognition processing unit 22, the presentation processing unit 23, and the traveling speed information acquisition unit 24 are illustrated to be connected to each other via a bus BS.

The image data acquisition unit 21 acquires image data captured by the imager 11. For example, the image data acquisition unit 21 acquires image data that is captured by imaging a front side of the vehicle and output by the imager 11.

The recognition processing unit 22 performs object recognition processing on the image data acquired by the image data acquisition unit 21. For example, the recognition processing unit 22 performs various kinds of object recognition processing using dictionary data stored in the dictionary data storage 12, and recognizes an object included in the image data.

The recognition processing unit 22 performs person recognition processing on the image data using dictionary data for detecting a person, and recognizes a person included in the image data. In the present embodiment in which a bicycle on which a person is riding included in the image data is recognized by using dictionary data for detecting a bicycle on which a person is riding, the recognition processing unit 22 recognizes a person and a bicycle on which a person is riding included in the image data as a specific object.

For example, as a result of performing the object recognition processing on the image data acquired by the image data acquisition unit 21, in a case in which a score indicating a likelihood of the specific object is equal to or larger than a predetermined threshold, the recognition processing unit 22 recognizes the object included in the image data as the specific object.

The recognition processing unit 22 calculates a score indicating a likelihood of a person by performing person recognition processing, and recognizes a person based on a value of the calculated score. A maximum value of the score indicating the likelihood of a person is 1.0, for example. For example, the recognition processing unit 22 determines that the recognized object is a person as the specific object in a case in which the score is equal to or larger than 0.9 in a normal case.

The recognition processing unit 22 changes the threshold of the score for determining that the recognized object is a person in accordance with a traveling speed of the vehicle. For example, in a case in which the traveling speed of the vehicle is equal to or higher than a predetermined speed, the recognition processing unit 22 lowers the threshold of the score for determining that the object is a person. For example, when the traveling speed of the vehicle is equal to or higher than 60 km/h, the recognition processing unit 22 determines that the recognized object is a person in a case in which the score is equal to or larger than 0.7.

The recognition processing unit 22 may change the threshold of the score for determining that the recognized object is a person in a stepwise manner in accordance with the traveling speed of the vehicle. For example, when the traveling speed of the vehicle is equal to or higher than 60 km/h and lower than 70 km/h, the recognition processing unit 22 may determine that the recognized object is a person in a case in which the score is equal to or larger than 0.7. For example, when the traveling speed of the vehicle is equal to or higher than 70 km/h and lower than 80 km/h, the recognition processing unit 22 may determine that the recognized object is a person in a case in which the score is equal to or larger than 0.6. For example, when the traveling speed of the vehicle is equal to or higher than 80 km/h and lower than 90 km/h, the recognition processing unit 22 may determine that the recognized object is a person in a case in which the score is equal to or larger than 0.5.

The recognition processing unit 22 may also linearly change the threshold of the score for determining that the recognized object is a person in accordance with the traveling speed of the vehicle. For example, after the traveling speed of the vehicle becomes 60 km/h and the score is changed to be 0.7, the recognition processing unit 22 may linearly lower the score as the traveling speed of the vehicle increases.

In the present embodiment, the value of the score for determining the specific object by the recognition processing unit 22 is merely an example, and the value is not limited thereto. The value of the score for determining the specific object by the recognition processing unit 22 may be optionally changed in accordance with design.

In the present embodiment, the recognition processing unit 22 recognizes a person and a bicycle on which a person is riding as the specific object, but the specific object recognized by the recognition processing unit 22 is not limited thereto. For example, the recognition processing unit 22 may also detect an automobile, a motorcycle, and the like included in the image data as the specific object.

The presentation processing unit 23 presents information about the specific object specified by the recognition processing unit 22 to the driver and the like. The presentation processing unit 23 presents the information about the specific object to the driver using display 13 or voice output from a voice output unit (not illustrated). Thus, in a case of presenting the information about the specific object to the driver using display 13, the presentation processing unit 23 functions as a display controller. In a case of causing the display 13 to display the information about the specific object, the presentation processing unit 23 causes the display 13 to display the image data acquired by the image data acquisition unit 21. In a case in which the specific object is recognized, the presentation processing unit 23 causes the driver to recognize the specific object by displaying a frame line surrounding the recognized specific object.

The traveling speed information acquisition unit 24 acquires information about the traveling speed of the vehicle. For example, the traveling speed information acquisition unit 24 acquires the information about the traveling speed of the vehicle from the CAN via the CAN interface unit 14.

Specific Object Recognition Processing

Figure 2:
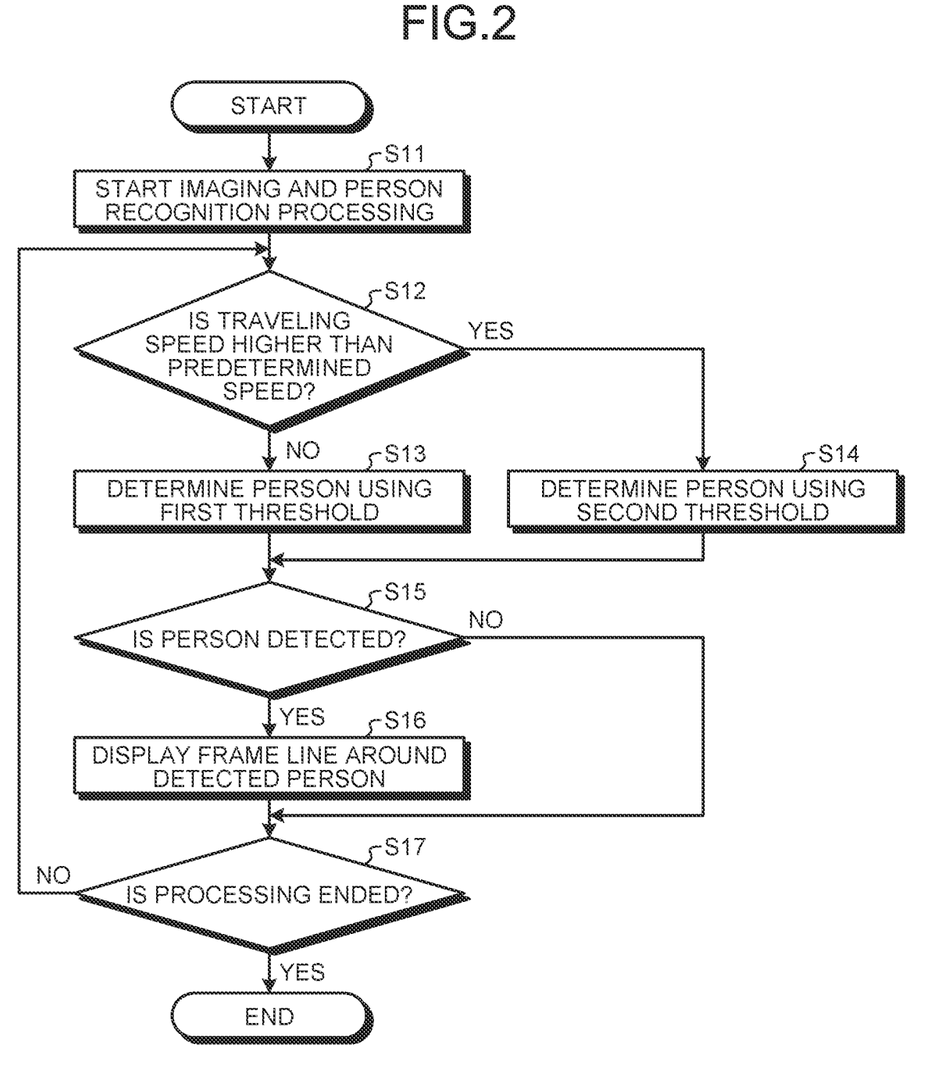
FIG. 2 is a flowchart illustrating an example of processes of object recognition processing according to the first embodiment.

The following describes recognition processing for the specific object according to the first embodiment with reference to FIG. 2. FIG. 2 is a flowchart illustrating an example of processes of recognition processing for the specific object according to the first embodiment.

When the processing of FIG. 2 is started, the controller 20 starts imaging and person recognition processing (Step S11). Specifically, the controller 20 causes the imager 11 to start imaging, and the recognition processing unit 22 starts to perform recognition processing on the image data acquired by the image data acquisition unit 21. The process then proceeds to Step S12. The processing of FIG. 2 is started under any condition. For example, the condition is that the vehicle becomes available such as a case in which an engine of the vehicle on which the object recognition device 1 is mounted is started, or operation of the object recognition device 1 is started by an operation performed by a user. The process at Step S11 may be performed under a condition that the vehicle is traveling.

When the process at Step S11 is started, the controller 20 determines whether the traveling speed of the vehicle is equal to or higher than a predetermined speed (Step S12). Specifically, the recognition processing unit 22 determines whether the traveling speed of the vehicle is equal to or higher than the predetermined speed based on the information about the traveling speed of the vehicle acquired by the traveling speed information acquisition unit 24. When it is determined that the traveling speed is not equal to or higher than the predetermined speed (No at Step S12), the process proceeds to Step S13. When it is determined that the traveling speed is equal to or higher than the predetermined speed (Yes at Step S12), the process proceeds to Step S14.

If it is determined to be NO at Step S12, the controller 20 determines a person using a first threshold as the threshold of the score for determining that the object is a person (Step S13). As a specific example, the recognition processing unit 22 determines that the object is a person in a case in which the score indicating the likelihood of a person is equal to or larger than 0.9. The process then proceeds to Step S15.

When it is determined to be Yes at Step S12, the controller 20 determines a person using a second threshold smaller than the first threshold as the threshold of the score for determining that the object is a person (Step S14). As a specific example, the recognition processing unit 22 determines that the object is a person in a case in which the score indicating the likelihood of a person is equal to or larger than 0.7. The process then proceeds to Step S15.

The controller 20 determines whether a person is detected (Step S15). Specifically, the recognition processing unit 22 determines whether a person is recognized with the score at Step S13 or Step S14. When it is determined that a person is detected (Yes at Step S15), the process proceeds to Step S16. When it is determined that a person is not detected (No at Step S15), the process proceeds to Step S17.

If it is determined to be Yes at Step S15, the controller 20 displays a frame line around the detected person (Step S16). Specifically, the presentation processing unit 23 displays a frame line around the detected person so that the driver and the like can grasp the detected person. The process then proceeds to Step S17.

The controller 20 determines whether to end the specific object recognition processing (Step S17). For example, the controller 20 determines to end the specific object recognition processing in a case of receiving an operation of ending the specific object recognition processing, or a case of receiving an operation of turning off a power supply of the object recognition device 1. When it is determined to end the specific object recognition processing (Yes at Step S17), the processing of FIG. 2 is ended. When it is determined not to end the specific object recognition processing (No at Step S17), the process proceeds to Step S11.

In the first embodiment, the threshold of the score indicating a likelihood of a person or a bicycle on which a person is riding is changed based on the traveling speed of the vehicle to detect the specific object such as a person or a bicycle on which a person is riding included in the image data. Thus, in the first embodiment, a person or a bicycle on which a person is riding included in the image data can be appropriately detected even in a case in which the traveling speed of the vehicle is higher than the predetermined speed.

In the first embodiment, recognition processing is performed by lowering the score indicating the likelihood of the specific object in a case in which the traveling speed of the vehicle is high, so that the specific object which is partially hidden by another object and which is not recognized as the specific object with a normal score is recognized as the specific object. Thus, the driver of the vehicle can recognize presence of the specific object more appropriately.

In a case in which the traveling speed is higher than the predetermined speed, a visual field of the driver of the vehicle tends to be narrow. In the first embodiment, in a case in which the traveling speed of the vehicle is high, recognition processing is performed by lowering the score indicating the likelihood of the specific object. Thus, an object that is not recognized as the specific object with a normal score can also be presented as a recognition result, and the driver of the vehicle is enabled to perform driving while considering safety more important.

Modification of First Embodiment

Next, the following describes a modification of the first embodiment. In the first embodiment, the controller 20 determines whether the traveling speed of the vehicle is equal to or higher than the predetermined speed at Step S12 in FIG. 2, but the present application is not limited thereto. For example, at Step S12, the controller 20 may determine whether a time for which the traveling speed of the vehicle is equal to or higher than the predetermined speed has continued to be equal to or longer than a predetermined time. The predetermined time is, for example, 60 seconds, but is not limited thereto.

Thus, in a case in which a state in which the traveling speed acquired by the traveling speed information acquisition unit 24 is higher than the predetermined speed has continued for the predetermined time or more, the recognition processing unit 22 determines a person using the second threshold smaller than the first threshold as the threshold of the score for determining that the object is a person. The case in which the state in which the traveling speed is higher than the predetermined speed has continued for the predetermined time or more is not a case in which the traveling speed temporarily becomes higher than the predetermined speed but a case in which traveling at a speed higher than the predetermined speed has continued. In such a state, the visual field of the driver of the vehicle tends to be narrow, so that an object that is not recognized as the specific object with a normal score can also be presented as a recognition result, and the driver of the vehicle is enabled to perform driving while considering safety more important.

Second Embodiment

Figure 3:
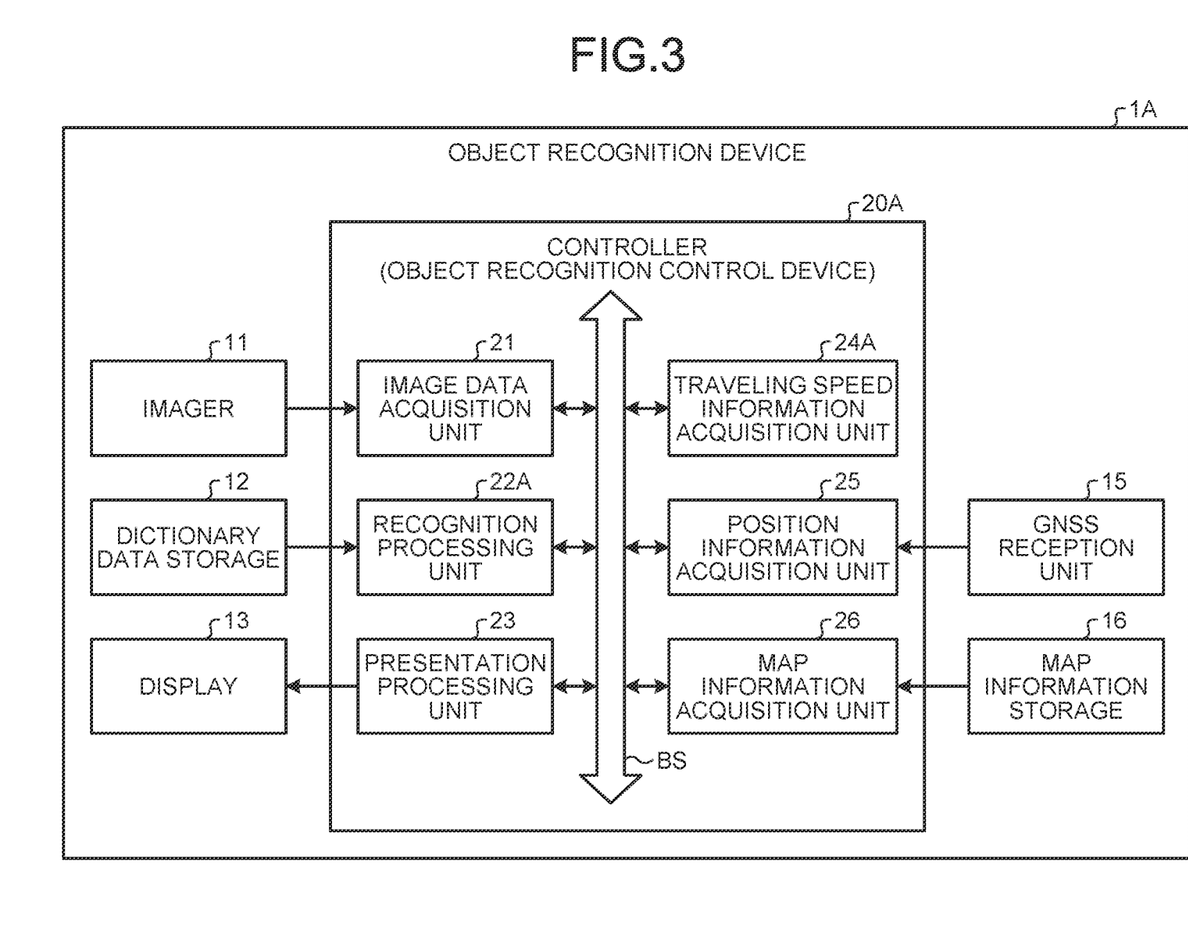
FIG. 3 is a block diagram illustrating a configuration example of object recognition device according to a second embodiment.

The following describes the object recognition device according to a second embodiment with reference to FIG. 3. FIG. 3 is a block diagram illustrating a configuration example of the object recognition device according to the second embodiment.

As illustrated in FIG. 3, an object recognition device 1A is different from the object recognition device 1 illustrated in FIG. 1 in that the object recognition device 1A does not include the CAN interface unit 14 but includes a Global Navigation Satellite System (GNSS) reception unit 15 and a map information storage 16. Additionally, the object recognition device 1A is different from the object recognition device 1 illustrated in FIG. 1 in that a controller 20A includes a position information acquisition unit 25 and a map information acquisition unit 26.

The GNSS reception unit 15 receives GNSS signals from GNSS satellites (not illustrated). The GNSS reception unit 15 is implemented by a GNSS reception circuit, a GNSS reception device, and the like. The GNSS reception unit 15 outputs the received GNSS signals to the position information acquisition unit 25.

The map information storage 16 stores various pieces of map information. For example, the map information storage 16 is implemented by a semiconductor memory element such as a RAM and a flash memory, a storage device such as a hard disk, or an external server connected by a communication function (not illustrated).

The position information acquisition unit 25 acquires the GNSS signals from the GNSS reception unit 15. For example, the position information acquisition unit 25 calculates current position information on the vehicle using a known method based on the GNSS signals acquired from the GNSS reception unit 15.

The map information acquisition unit 26 acquires the map information from the map information storage 16. For example, the map information acquisition unit 26 acquires map information corresponding to the current position information calculated by the position information acquisition unit 25 from the map information storage 16.

A recognition processing unit 22A changes the threshold of the score for determining that the recognized object is a person in accordance with a possible traveling speed of a road on which the vehicle is traveling. For example, in a case in which the possible traveling speed is equal to or higher than the predetermined speed, the recognition processing unit 22A lowers the threshold of the score for determining that the object is a person. For example, when the possible traveling speed is equal to or higher than 60 km/h, the recognition processing unit 22A determines that the recognized object is a person in a case in which the score is equal to or larger than 0.7.

A traveling speed information acquisition unit 24A determines the possible traveling speed of the road on which the vehicle is traveling based on the current position information calculated by the position information acquisition unit 25 and the map information acquired by the map information acquisition unit 26. For example, the traveling speed information acquisition unit 24A determines whether the road on which the vehicle is traveling is a road on which the vehicle can travel at a speed equal to or higher than 60 km/h such as an expressway and a freeway.

The traveling speed information acquisition unit 24A may determine the possible traveling speed of the road on which the vehicle is traveling based on a road sign recognized by the recognition processing unit 22A from the image data acquired by the image data acquisition unit 21. The road sign as a determination target includes a sign for regulating the possible traveling speed due to weather and the like. The traveling speed information acquisition unit 24A may also acquire information on the possible traveling speed of the road on which the vehicle is traveling from an external server and the like using a communication function (not illustrated).

Specific Object Recognition Processing

Figure 4:
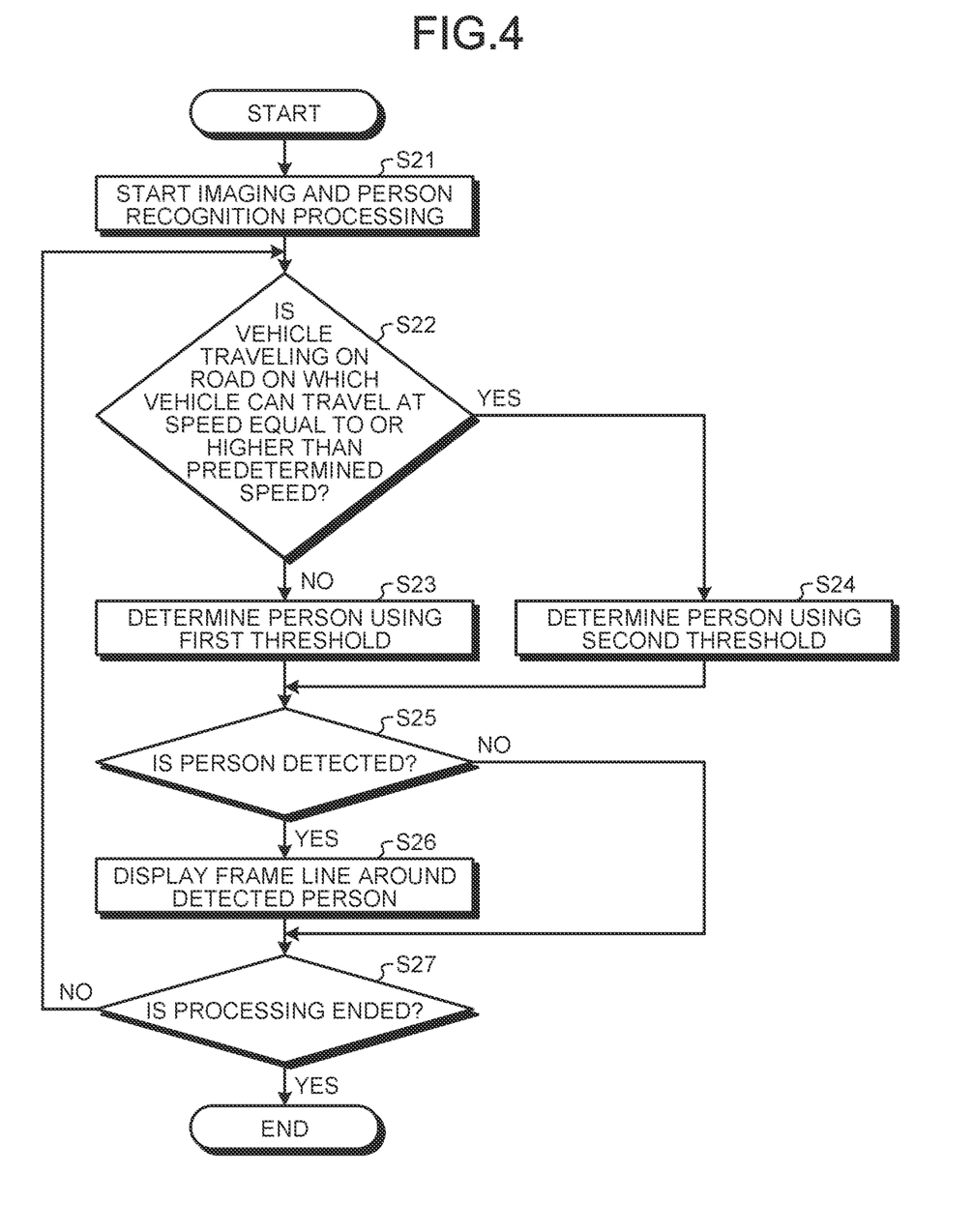
FIG. 4 is a flowchart illustrating an example of processes of object recognition processing according to the second embodiment.

The following describes recognition processing for the specific object according to the second embodiment with reference to FIG. 4. FIG. 4 is a flowchart illustrating an example of processes of recognition processing for the specific object according to the second embodiment.

Processes at Step S21, and Step S23 to Step S27 illustrated in FIG. 4 are the same as the processes at Step S11, and Step S13 to Step S17 illustrated in FIG. 2, so that the description thereof will not be repeated.

The controller 20A determines whether the vehicle is traveling on the road on which the vehicle can travel at a speed equal to or higher than the predetermined speed (Step S22). Specifically, the traveling speed information acquisition unit 24 determines whether the road on which the vehicle is currently traveling is a road on which the vehicle can travel at a speed equal to or higher than the predetermined speed based on the current position information and the map information. When it is determined that the road is not a road on which the vehicle can travel at a speed equal to or higher than the predetermined speed (No at Step S22), the process proceeds to Step S23. When it is determined that the road is a road on which the vehicle can ravel at a speed equal to or higher than the predetermined speed (Yes at Step S22), the process proceeds to Step S24.

In the second embodiment, the threshold of the score indicating the likelihood of a person is changed based on the possible traveling speed of the road on which the vehicle is traveling to detect a person or a bicycle on which a person is riding included in the image data. Thus, in the second embodiment, a person or a bicycle on which a person is riding included in the image data can be appropriately detected even in a case in which the possible traveling speed of the road on which the vehicle is traveling is higher than the predetermined speed.

In the second embodiment, the recognition processing is performed by lowering the score indicating the likelihood of the specific object in a case in which the possible traveling speed of the road on which the vehicle is traveling is equal to or higher than the predetermined speed, so that the specific object which is partially hidden by an object and which is not recognized as the specific object with a normal score is recognized as the specific object. Thus, the driver of the vehicle can recognize presence of the specific object more appropriately.

Furthermore, in the second embodiment, the recognition processing is performed by lowering the score indicating the likelihood of the specific object in a case in which the possible traveling speed of the road on which the vehicle is traveling is equal to or higher than the predetermined speed. Thus erroneous recognition of determining an object that is not the specific object to be the specific object is increased. However, presence of the specific object is presented even as erroneous recognition, so that the driver of the vehicle is enabled to perform driving while considering safety more important.

Modification of Second Embodiment

Figure 5:
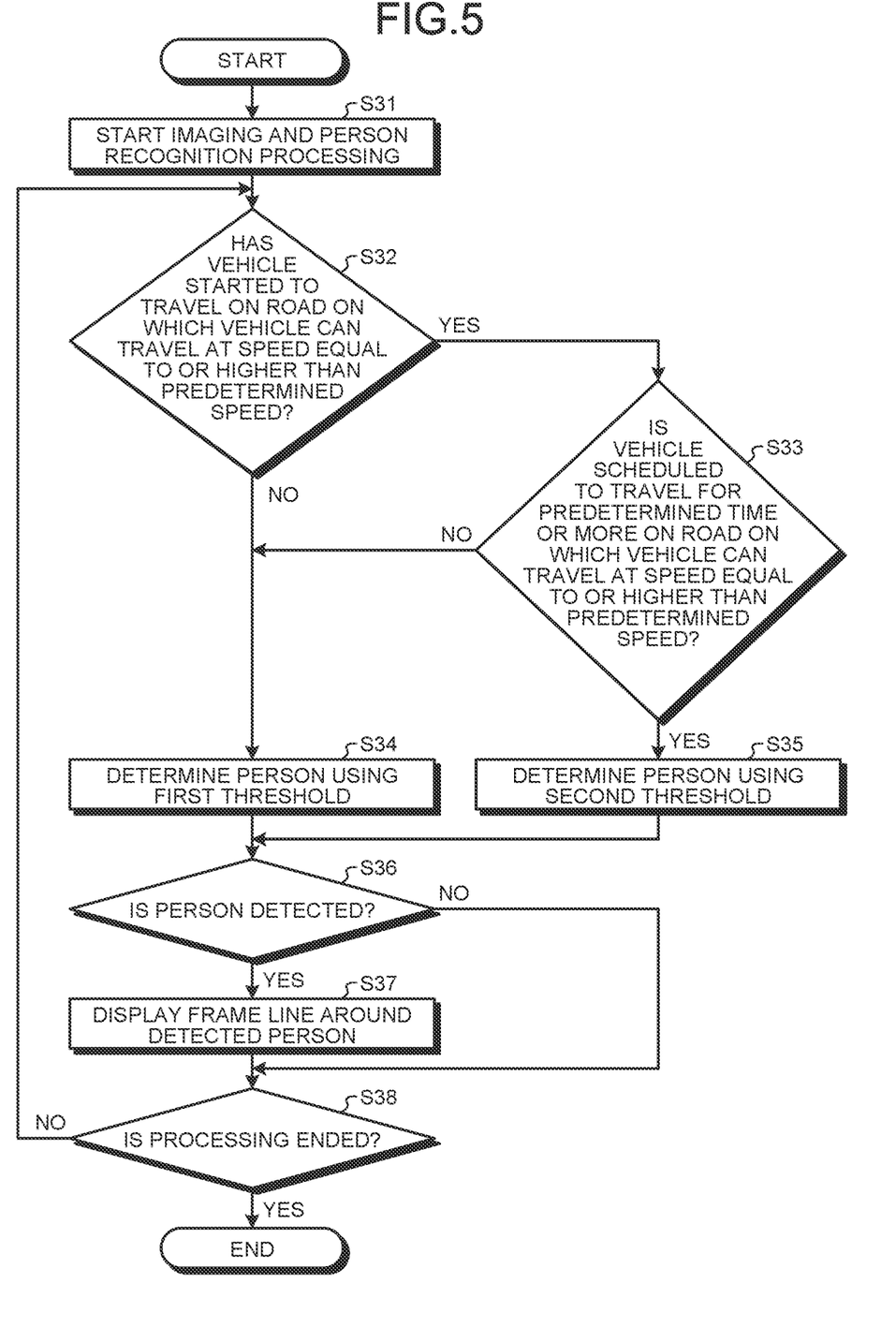
FIG. 5 is a flowchart illustrating an example of processes of object recognition processing according to a modification of the second embodiment.

Next, the following describes a modification of the second embodiment with reference to FIG. 5. FIG. 5 is a flowchart illustrating an example of processes of object recognition processing according to the modification of the second embodiment. The configuration of the object recognition device according to the modification of the second embodiment is the same as that of the object recognition device 1A illustrated in FIG. 3, so that the description thereof will not be repeated.

A process at Step S31 is the same as the process at Step S21 illustrated in FIG. 4, so that the description thereof will not be repeated.

After Step S31, the controller 20A determines whether the vehicle has started to travel on the road on which the vehicle can travel at a speed equal to or higher than the predetermined speed (Step S32). Specifically, the traveling speed information acquisition unit 24 determines whether the vehicle has started to travel on the road on which the vehicle can travel at a speed equal to or higher than the predetermined speed based on the current position information and the map information. When it is not determined that the vehicle has started to travel on the road on which the vehicle can travel at a speed equal to or higher than the predetermined speed (No at Step S32), the process proceeds to Step S34. When it is determined that the vehicle has started to travel on the road on which the vehicle can travel at a speed equal to or higher than the predetermined speed (Yes at Step S32), the process proceeds to Step S33.

When it is determined to be Yes at Step S32, the controller 20A determines whether the vehicle is scheduled to travel for a predetermined time or more on the road on which the vehicle can travel at a speed equal to or higher than the predetermined speed (Step S33). For example, in a case in which a route to a destination is set when the vehicle starts to travel on a national road or a freeway, and a traveling schedule for the road is equal to or longer than a predetermined distance, the controller 20A determines that the vehicle is scheduled to travel for a predetermined time or more on the road on which the vehicle can travel at a speed equal to or higher than the predetermined speed. In addition to the case in which the traveling schedule for the road is equal to or longer than the predetermined distance, a case in which there is no traffic jam on the road on which the vehicle is scheduled to travel may be added to a condition for determination by the controller 20A. When it is not determined that the vehicle is scheduled to travel for a predetermined time or more on the road on which the vehicle can travel at a speed equal to or higher than the predetermined speed (No at Step S33), the process proceeds to Step S34. When it is determined that the vehicle is scheduled to travel for a predetermined time or more on the road on which the vehicle can travel at a speed equal to or higher than the predetermined speed (Yes at Step S33), the process proceeds to Step S35.

Processes at Step S34 to Step S38 are the same as the processes at Step S23 to Step S27, so that the description thereof will not be repeated.

In the modification of the second embodiment, when the vehicle is scheduled to travel for a predetermined time or more on the road on which the vehicle can travel at a speed equal to or higher than the predetermined speed, the threshold of the score indicating the likelihood of a person is lowered to detect the specific object such as a person or a bicycle on which a person is riding included in the image data. In such a state, the visual field of the driver of the vehicle is assumed to be narrow due to traveling at a speed equal to or higher than the predetermined speed on the road where the vehicle has started to travel, so that an object that is not recognized as the specific object with a normal score can also be presented as the recognition result, and the driver of the vehicle is enabled to perform driving while considering safety more important.

Third Embodiment

Figure 6:
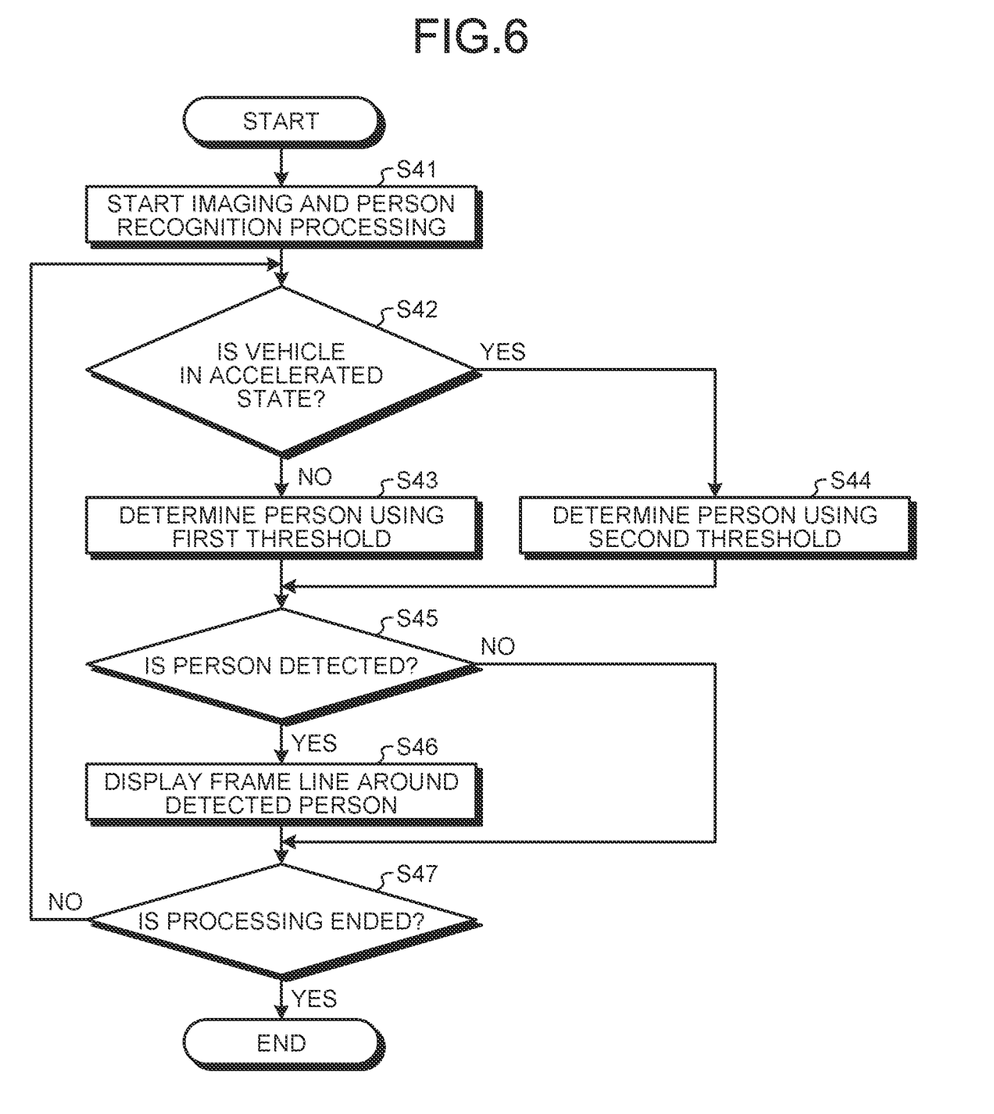
FIG. 6 is a flowchart illustrating an example of processes of object recognition processing according to a third embodiment.

Next, the following describes a third embodiment with reference to FIG. 6. FIG. 6 is a flowchart illustrating an example of processes of object recognition processing according to the third embodiment. The configuration of the object recognition device according to the third embodiment is the same as that of the object recognition device 1 illustrated in FIG. 1, so that the description thereof will not be repeated.

A Process at Step S41 is the same as the process at Step S11 illustrated in FIG. 2, so that the description thereof will not be repeated.

After Step S41, the controller 20 determines whether the vehicle is in an accelerated state (Step S42). Specifically, the traveling speed information acquisition unit 24 determines whether the vehicle is in the accelerated state based on time transition of speed information, or a detection result of acceleration in a traveling direction obtained by an acceleration sensor (not illustrated). For example, the traveling speed information acquisition unit 24 determines that the vehicle is in the accelerated state in a case in which the accelerated state has continued for 5 seconds or more from a start of acceleration, for example. Additionally, the traveling speed information acquisition unit 24 determines that the vehicle is in the accelerated state in a case in which the accelerated state has continued for 5 seconds or more from a state in which the vehicle is traveling at a speed equal to or higher than the predetermined speed (for example, equal to or higher than 60 km/h), for example. When it is not determined that the vehicle is in the accelerated state (No at Step S42), the process proceeds to Step S43. When it is determined that the vehicle is in the accelerated state (Yes at Step S42), the process proceeds to Step S44.

Processes at Step S43 to Step S47 S44 are the same as the processes at Step S13 to Step S17 illustrated in FIG. 2, so that the description thereof will not be repeated.

In the third embodiment, in a case in which the vehicle is in the accelerated state, the threshold of the score indicating the likelihood of the specific object such as a person or a bicycle on which a person is riding is lowered to detect a person or a bicycle on which a person is riding included in the image data. As the visual field of the driver of the vehicle tends to be narrow in a case in which the vehicle is in the accelerated state, according to the third embodiment, an object that is not recognized as the specific object with a normal score can also be presented as the recognition result, and the driver of the vehicle is enabled to perform driving while considering safety more important.

According to the present application, a specific object can be appropriately recognized.

The embodiments of the present application have been described above, but the present application is not limited to the content of the embodiments. In the above embodiments, the example in which a person or a bicycle on which a person is riding is recognized is described, but the subject to be recognized is not limited thereto, and various subject can be recognized. The constituent elements described above encompass a constituent element easily conceivable by those skilled in the art, substantially the same constituent element, and what is called an equivalent. The constituent elements described above can also be appropriately combined with each other. In addition, the constituent elements can be variously omitted, replaced, or modified without departing from the gist of the embodiments described above.

An object recognition control device according to the present application can be applied to, for example, a drive recorder.

What is claimed is:

1. An object recognition control device comprising:
   an image data acquisition unit configured to acquire image data captured by a camera that images a periphery of a vehicle;
   a traveling speed information acquisition unit configured to acquire information about a traveling speed of the vehicle;
   a recognition processing unit configured to recognize, as a specific object, the image data acquired by the image data acquisition unit in a case in which a score indicating a likelihood of the specific object is equal to or larger than a predetermined threshold; and
   a presentation processing unit configured to present, to a driver of the vehicle, information on the specific object recognized by the recognition processing unit, wherein
   the traveling speed information acquisition unit is further configured to acquire a possible traveling speed of a road on which the vehicle is traveling as the information about the traveling speed of the vehicle based on current position information on the vehicle and map information, and
   the recognition processing unit is further configured to lower the predetermined threshold in a case in which the vehicle is scheduled to travel by a predetermined distance or more on a road the possible traveling speed of which acquired by the traveling speed information acquisition unit is equal to or higher than the predetermined speed.

2. The object recognition control device according to claim 1, wherein the recognition processing unit is further configured to lower the predetermined threshold in a case in which the vehicle is scheduled to travel by the predetermined distance or more with no traffic jam on a road the possible traveling speed of which acquired by the traveling speed information acquisition unit is equal to or higher than the predetermined speed.

3. An object recognition control device comprising:
   an image data acquisition unit configured to acquire image data captured by a camera that images a periphery of a vehicle;
   a traveling speed information acquisition unit configured to acquire information about a traveling speed of the vehicle;
   a recognition processing unit configured to recognize, as a specific object, the image data acquired by the image data acquisition unit in a case in which a score indicating a likelihood of the specific object is equal to or larger than a predetermined threshold; and
   a presentation processing unit configured to present, to a driver of the vehicle, information on the specific object recognized by the recognition processing unit, wherein
   the traveling speed information acquisition unit is further configured to acquire change information on the traveling speed of the vehicle as the information about the traveling speed of the vehicle, and
   the recognition processing unit is further configured to lower the predetermined threshold in a case in which the change information on the traveling speed of the vehicle acquired by the traveling speed information acquisition unit indicates that an accelerated state has continued for a predetermined time or more from a state that indicates the traveling speed of the vehicle is high.

4. The object recognition control device according to claim 1, wherein
   the image data acquisition unit is further configured to acquire image data captured by a camera that images a front side of the vehicle, and
   the recognition processing unit is further configured to recognize a person or a bicycle on which a person is riding as the specific object.

5. The object recognition control device according to claim 3, wherein
   the image data acquisition unit is further configured to acquire image data captured by a camera that images a front side of the vehicle, and
   the recognition processing unit is further configured to recognize a person or a bicycle on which a person is riding as the specific object.

6. An object recognition control method comprising:
   acquiring image data captured by a camera that images a periphery of a vehicle;
   acquiring information about a traveling speed of the vehicle;
   recognizing, as a specific object, the acquired image data in a case in which a score indicating a likelihood of the specific object is equal to or larger than a predetermined threshold; and
   presenting, to a driver of the vehicle, information on the recognized specific object, wherein
   the acquiring of information further comprises acquiring a possible traveling speed of a road on which the vehicle is traveling as the information about the traveling speed of the vehicle based on current position information on the vehicle and map information, and
   the recognizing further comprises lowering the predetermined threshold in a case in which the vehicle is scheduled to travel by a predetermined distance or more on a road the possible traveling speed of which acquired by the acquiring of information is equal to or higher than the predetermined speed.

7. The object recognition control method according to claim 6, further comprising:

acquiring image data captured by a camera that images a front side of the vehicle, and recognizing a person or a bicycle on which a person is riding as the specific object.

\* \* \* \* \*